July 4, 1961 R. J. HOOVER, JR 2,990,685
IMPULSE-TYPE GAS TURBINE POWER PLANT
Filed July 7, 1959 4 Sheets-Sheet 1

INVENTOR.
ROBERT J. HOOVER, JR.

July 4, 1961 R. J. HOOVER, JR 2,990,685
IMPULSE-TYPE GAS TURBINE POWER PLANT
Filed July 7, 1959 4 Sheets-Sheet 2

INVENTOR.
ROBERT J. HOOVER, JR.

INVENTOR.
ROBERT J. HOOVER, JR

INVENTOR.
ROBERT J. HOOVER, JR.

United States Patent Office 2,990,685
Patented July 4, 1961

2,990,685
IMPULSE-TYPE GAS TURBINE POWER PLANT
Robert J. Hoover, Jr., 1156 N. Normandie,
Los Angeles, Calif.
Filed July 7, 1959, Ser. No. 825,466
3 Claims. (Cl. 60—39.52)

This invention relates to the gas turbine art and, more particularly, pertains to an improved semi-closed cycle or closed cycle impulse-type, gas turbine power plant.

It is commonly known from the view point of thermal dynamics, that a gas turbine plant operates at higher efficiencies with increased temperature and pressure of the working medium employed in the cycle.

Further, conventional gas turbine plants normally employ multi-stage axial turbine wheels. It is clear that simpler and more compact construction can be attained, when a gas turbine plant is provided with a single impulse-type turbine rotor, instead of the conventional multi-stage axial type turbine wheel. This construction will further minimize the space requirements of the plant and increase the dynamic balance of the shafting provided with a compressor rotor.

Most gas turbine plants, which operate with high efficiencies, are provided with heat exchangers. Such exchangers, however, increase the space requirements of the plant as well as the initial cost thereof.

It is, therefore, an object of this invention to provide a gas turbine plant, which operates on the semi-closed cycle principle, allowing higher operating temperature and pressure, say, as high as 1,600° F. and 15,000 p.s.i., respectively.

It is another object of this invention to provide a gas turbine plant, which is provided with a single, impulse turbine rotor, instead of the conventional axial flow, multi-stage rotor or rotors.

It is still another object of this invention to provide a gas turbine, which is provided with well balanced rotating parts.

It is a further object of this invention to provide a gas turbine plant, which has dispensed with conventional heat exchanger or exchangers.

The foregoing and other objects and advantages of the present invention will appear more fully hereinafter from a consideration of the detailed description which follows, taken together with the accompanying drawings, wherein a superior embodiment of the invention is illustrated by way of example. It is to be expressly understood, however, the drawings are for illustration purposes only and are not to be construed as defining the limits of the invention.

Figure 1:
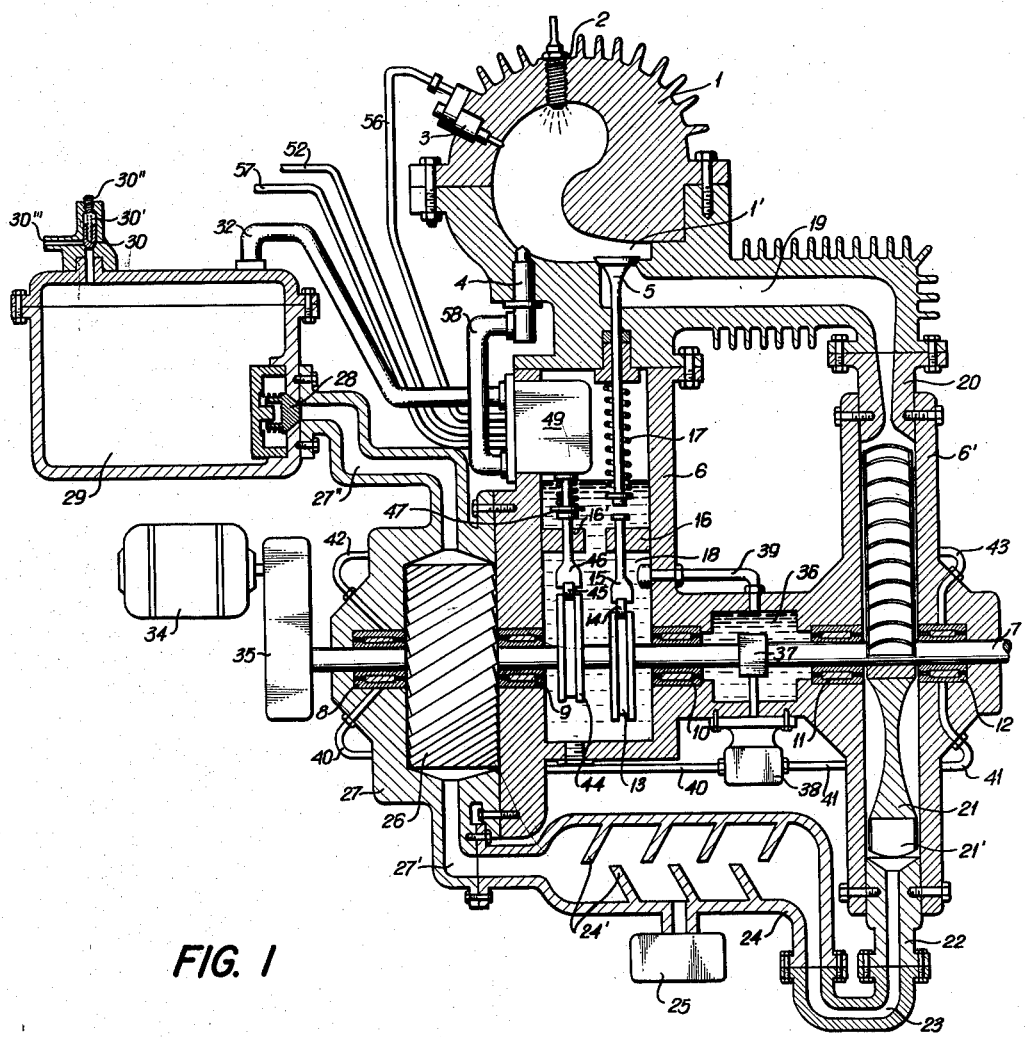
FIG. 1 shows a longitudinal view, partly in section, of one embodiment of a gas turbine plant according to this invention.

The gas turbine plant according to this application finds various applications, such as for automobile power generation, traction power generation, stationary power generation, and marine power generation, ship propulsion (especially useful for high speed racing and fishing boats) or the like.

Now, referring to the drawings, 1 denotes the combustion chamber made of a high grade heat-resisting steel, which allows a continuous operation of, say, 1,000 hours at a temperature of about 1,600° F. and a pressure of 15,000 p.s.i. The chamber is designed in the shape of a helical oval having a flat, narrow lower extremity and is provided with at least an ignition plug 2, fuel nozzle 3, and injector 4. At the discharge opening provided in the outlet narrow passage 1', there is a poppet type exhaust valve 5. The aforementioned design of the combustion chamber insures complete combustion of fuel and a smooth vortex flow of the combustion gases. 6 represents the main casing, in which the main shaft 7 is rotatably supported by means of a plurality of main bearings 8–12. The main shaft 7 is provided with cams 13 and 44, and just thereabout tappets 15 and 46 are slidably mounted in guide members 16 and 16' fixed within the main casing 6, said tappets being provided with cam rollers 14 and 45, respectively. 17 represents a valve spring, which urges the exhaust valve 5 to close. A lubricating oil reservoir 18 is provided in the main casing 6, and said cams 13, 44, and parts of said tappets 15, 46 with cam rollers 14 and 45 are submerged in oil contained therein, thus insuring adequate lubrication at high r.p.m. The lower part of the split-type combustion chamber 1 is bolted to said main casing 6 and provided with a finned duct 19 extending to the right in FIG. 1, the outer end of said duct being bolted through a nozzle piece 20 to the turbine casing 6', which is part of said main casing. The nozzle is offset about 20° from the vertical center line.

The impulse turbine rotor 21 is made of an alloy steel of superior grade, having an ultimate strength of 100,000 p.s.i. with a yield point of 70,000 p.s.i. This rotor 21 consists of a disc with buckets 21' attached at 45° angles, is detachably fixed to the main shaft 7, and rotates within said turbine casing 6', which is shown diagrammatically as a one piece block. In practice, however, this casing 6' is made in the form of split construction to accommodate the turbine rotor 21 on the main shaft. The disc of the turbine is mounted on the main shaft by the use of a conical bushing. In addition, there are two keyways with keys on the disc and main shaft, respectively, which serve as safety members. No stress is exerted on the keys. The keyways are set 180° apart, to maintain balance. The buckets are ordinary impulse helical flow type, which permits maximum efficiency to be derived from the driving force of the expanded gases, when the plant operates.

An outlet piece 22 is bolted to said turbine casing 6' and connected through a pipe bend 23 to a scavenger 24, which is made of a highly heat-resisting steel just the same as with the combustion chamber 1. The scavenger 24 is made in a hollow tube, the interior of which contains a plurality of baffles 24' set at 60 deg. angles on top and bottom in a direction away from the pressure flow. The baffles 24' extend to the middle of the scavenger. On the bottom of the scavenger at a point exactly midway from either end or side is an adjustable valve 25, which regulates the intake of fresh air into the system. The primary function of the scavenger is to remove ash from the system and replenish the gases with fresh air as necessary. The valve spring (not shown) of valve 25 is preferably made adjustable from outside.

The compressor rotor 26 is capable of withstanding temperatures up to 1,600° F., however the working medium within the system will not normally be above 1,000°

F. at this stage. This rotor 26 is keyed to a conical bushing press-fit onto the main shaft 7 and is constructed to weigh exactly the same as the turbine rotor, and both rotors are in dynamic balance on the main shaft. The number of buckets 21' of the turbine rotor as well as that of the blades of the compressor rotor depend on the size of the power plant and the maximum horsepower desired; however, the ratio of turbine buckets to compressor blades is preferably selected to be 1.66:1. The compressor housing 27 is bolted to the main casing 6 and the rotor 26 rotates in the housing, the suction side of which 27' is connected with the scavenger 24 at the discharge end thereof, while the delivery side 27" is connected through a check valve 28 to the pressure chamber 29. The compressor blades are precisely worked out, having a tolerance of not more than 0.002 in. on the face and sides of the compressor housing 27, in order to prevent possible leakage as much as possible. Similar to the turbine, the compressor rotor 26 is mounted on the main shaft by the use of a conical bushing and two keyways with keys set 180 deg. apart, although not shown.

The pressure chamber 29 is cast of a highly heat-resisting material as in the case of said combustion chamber 1, and will withstand a temperature of about 1,600° F. and a pressure of about 15,000 p.s.i.

The chamber 29 is provided with a safety and relief valve 30 thereon, to keep the gas pressure prevailing therein at a predetermined level. This valve is, in turn, provided with an adjustable valve spring 30' which controls the inner pressure of said chamber at a predetermined value. 30" represents an adjusting screw, by means of which the tension of said valve spring 30', and thus the inner pressure in said chamber 29, can be properly adjusted. Said chamber 29 communicates through valve 30 and outlet opening 30''' to the open atmosphere.

Figure 2:
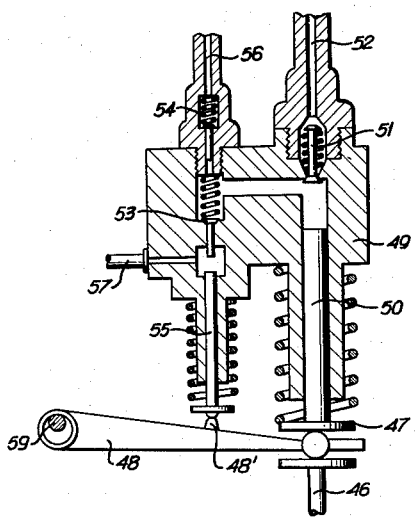
FIG. 2 represents a longitudinal section of the fuel pump part of the fuel and hot gas common control unit or assembly.
Figure 3:
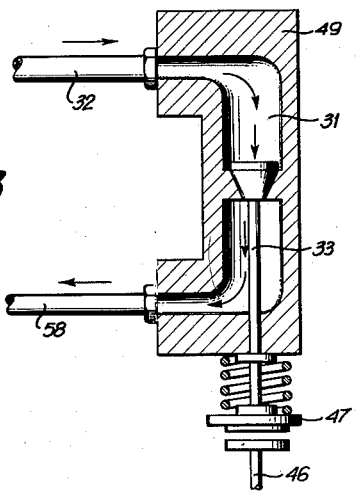
FIG. 3 is a longitudinal section of the hot gas control part of said common unit.
Figure 4:
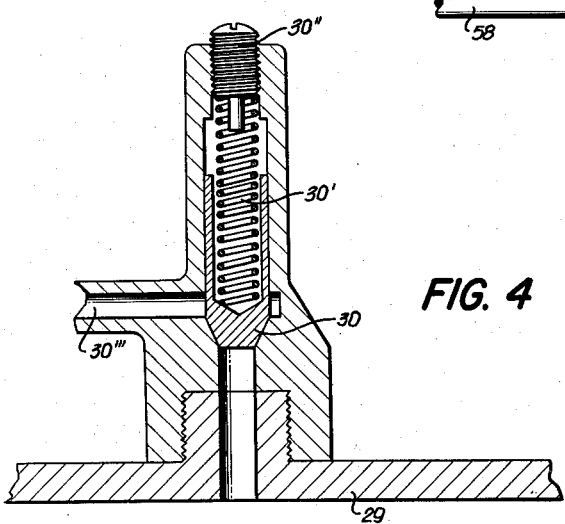
FIG. 4 represents an enlarged sectional view of a safety and relief valve provided on the pressurized gas reservoir.

The tappet 46 has twin heads which operate twin operating member portions 47, directly in the case of FIG. 3, and through an intermediary fuel delivery adjusting lever 48 in the case of FIG. 2. The common operating and control assembly is shown generally by a reference number 49 in FIG. 1 and consists, as already mentioned, of a fuel pump unit shown in FIG. 2 and a hot gas control means shown in FIG. 3; said assembly being operated by the aformentioned cam 44. The fuel pump comprises plunger 50, suction valve 51, fuel suction pipe 52 connected with a fuel tank (not shown), spill valve 53, delivery valve 54, spill valve-operating member 55 operated by said adjusting lever 48, spilled fuel return pipe 57 leading to said fuel tank, and valve springs for the above mentioned various valves. The construction and operation thereof are similar to that of conventional fuel pumps for normal diesel engines. The pivot of said adjusting lever 48 is adjustable up or down by means of an eccentric 59, the rotation of which may be carried out, as in the conventional manner, by hand, by the influence of a speed governor, or by both.

The inner space 31 of the assembly 49 communicates at one end thereof through piping 32 to said pressure chamber 29. In the aforementioned space 31, there is a control valve 33, which is normally closed by a spring as shown, and is operatively connected with said operating member 47. Thus, when the tappet 46 is moved upwardly by the influence of said cam 44, the control valve is opened, and at the same time, the plunger 50 is also moved upwardly to compress the fuel sucked-in in the preceding suction stroke. The aforementioned inner space 31 is connected at the opposite end through a piping 58 to said injector 4.

In FIG. 1, 34 represents a starting motor, which is connected through a free-wheeling type clutch 35 to the main shaft 7. Substantially at the middle of main shaft 7, there is a lubricating oil chamber 36 arranged in the main casing 6, the main shaft passing through this chamber. Although not shown, properly designed oil seals are arranged at the ends of said lubricating oil chamber or reservoirs 18 and 36, through which the main shaft passes. Similar oil seals are also provided at main bearings 8–12. The main shaft 7 is provided with a worm gearing in the oil chamber 36, said gearing being shown in the drawing generally by a reference number 37 and being arranged to drive an oil pump 38 arranged thereunder. Oil flows from reservoir 18 through pipe 39 to chamber 36 and is there conveyed under pressure therefrom by the pumps 38 through pipings 40 and 41 to main bearings 8–12 at the lower sides thereof. The oil is discharged from the main bearings at the upper sides thereof through pipings 42 and 43 and returns to said reservoir 18. Although not shown, it is preferable to arrange one or more oil coolers in the lubricating system, as is normal to those skilled in the art.

The main bearings 8–12 are preferably designed as needle bearings, each comprising inner and outer sleeves, between which a number of anti-frictional needles are arranged. It is to be mentioned, that the piping arrangement of fuel pump shown in FIG. 3 is represented somewhat in a different manner from that shown in FIG. 1, for the purpose of clarifying the drawing.

The operation of the aforementioned power plant is as follows:

In the case of starting and warming-up of the plant, the starting motor 34 is at first started, rotation is thus transmitted through the free-wheeling type clutch 35 to the main shaft 7, whereby the latter is rotated at a starting speed, for instance, of 1,000 r.p.m. The compressor rotor 26 sucks atmospheric air through valve 25 and delivers it under pressure, together with reclaimed gases, through duct 27" and check valve 28 into the pressure chamber 29. At a proper time, the plug 2 is switched on. The plug is arranged to be periodically energized at a proper timing rate by cams 13 and 44, as is well known in gasoline engines, or a glow plug may be used. This plug serves, however, only during the initial starting and warm-up stages of the plant. When pressure accumulates in the pressure chamber, it communicates through piping 32 with the inner space 31 of said assembly 49. By reason of the rotation of main shaft 7, the cams 13 and 44 rotate. One of the cams 44 pushes the tappet 46 upwardly by means of the roller 45, the control valve 33 being thereby opened through the intermediary operating member 47. The compressed air and exhaust gas mixture is thus injected from the pressure chamber 29 through inner chamber 31, piping 58 and injector 4 into combustion chamber 1. It should be noted that the tappet 46 has two heads, the first head being the one seen in the front in FIG. 1 and the one operating the first member 47 shown in FIGS. 1 and 3, and the second head of the tappet 46 being immediately behind the first head thereof so that it cannot be seen in FIG. 1, and being the one which operates through the member 48, the second member 47 shown in detail in FIG. 2, whereby both the hot exhaust gas and air control portion of the control assembly 49, shown in FIG. 3, and the fuel control portion of the control assembly 49, shown in detail in FIG. 2, are correspondingly and simultaneously operated by the two heads of the tappet 46. The operation of the first head of the tappet 46 has been described hereinabove. Simultaneously with the operation of the first head of the tappet 46, the second or rear head of the tappet 46 is operated and the fuel, which has been sucked in the preceding suction stroke from the fuel tank through the suction piping 52, is compressed by the plunger 50 during the present upward movement thereof. The fuel suction valve 51 automatically closes and the pressurized fuel is injected through delivery valve 54, delivery piping 56, and fuel injection nozzle 3, into combustion chamber 1. At the same time or slightly thereafter, the plug 2 emits a spark and the combustible gas mixture in chamber 1 is ignited, and the temperature and pressure rises to, say, 1,600° F. and 15,000 p.s.i., respectively. Before said ignition, when the plunger 50 is further moved upwardly, the lever 48 is rotated further in a counterclockwise direction in FIG. 2, the projection 48' on said lever 48 operates the operating member 55, which in turn pushes the spill valve 53 to open the latter, at which time the fuel delivery ceases. As already mentioned, the pivoted position of lever 48 is adjustable by rotating the eccentric 59 by hand, automatically by the influence of a governor, or by both, to control the delivery of fuel according to the desired output of the plant. The spilled fuel from valve 53 is returned through piping 57 of the fuel tank.

In a properly timed relation to the aforementioned combustion in the chamber 1, exhaust valve 5 is opened on each revolution of the main shaft, when the cam 13 thereon pushes the tappet 15 upwardly by means of the intermediary roller 14 and allows the combustion gases to pass the valved exhaust port in passage 1' into the duct 19 leading through nozzle piece 20 into the turbine housing 6'. The high temperature and high pressure gases pass over the buckets on the impulse turbine rotor 21, causing the latter to rotate in one direction. The expanded gases enter the scavenger 24 freely from outlet piece 22 through tube bend 23 located at the bottom of the turbine housing 6'. After ash removal by means of a number of baffles 24' and replenishment with fresh air sucked through intake valve 25, the mixture is drawn into the compressor by the vacuum action that the compressor creates. The intake of fresh air through said valve 25 may be adjusted according to the desired output of the plant, by hand, or automatically by the influence of a speed governor, or by both. These adjusting means are not shown in the drawings, but it is carried out easily in a similar way to the fuel delivery adjustment employed in conventional internal combustion engines.

The hot gas and air mixture sucked in, is compressed by the compressor rotor 26 and flows through delivery outlet 27" of compressor casing 27, and check valve 28 into the pressure chamber 29 again. Thereupon, the above-mentioned operating cycle is repeated. When the rotational speed of the main shaft 7 reaches a proper value, the ignition circuit including plug 2 is switched off, by hand, or automatically by a speed governor. Thereafter, self-ignition can take place by the high temperature of combustion chamber 1.

Although, in the embodiment above explained, only one combustion chamber is shown, it is clear to those skilled in the art that a plurality of combustion chambers, if necessary, may be arranged to operate only one turbine rotor, which is then supplied with combustion gases from all of the combustion chambers.

Figure 5:
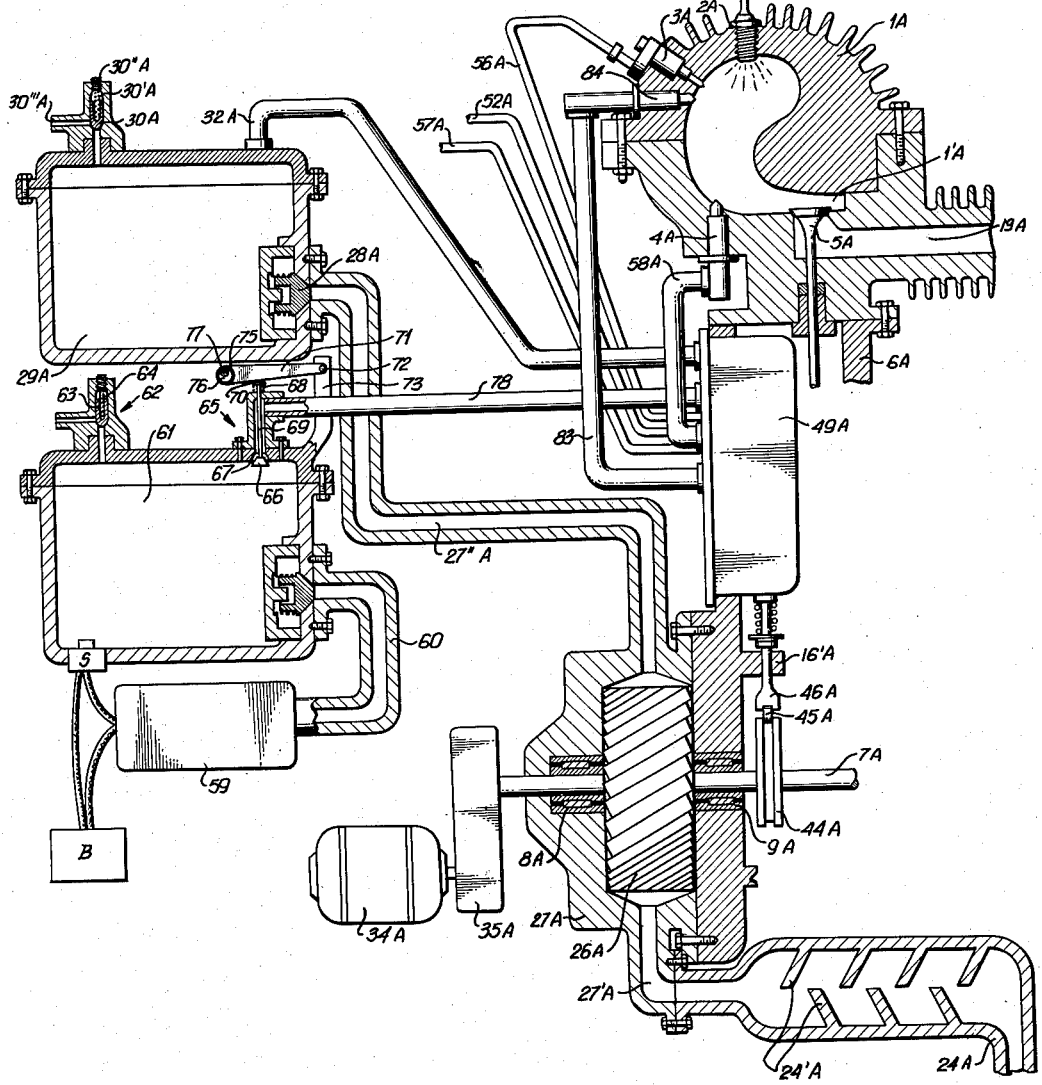
FIG. 5 is a view similar to FIG. 1 illustrating a slight modification.
Figure 6:
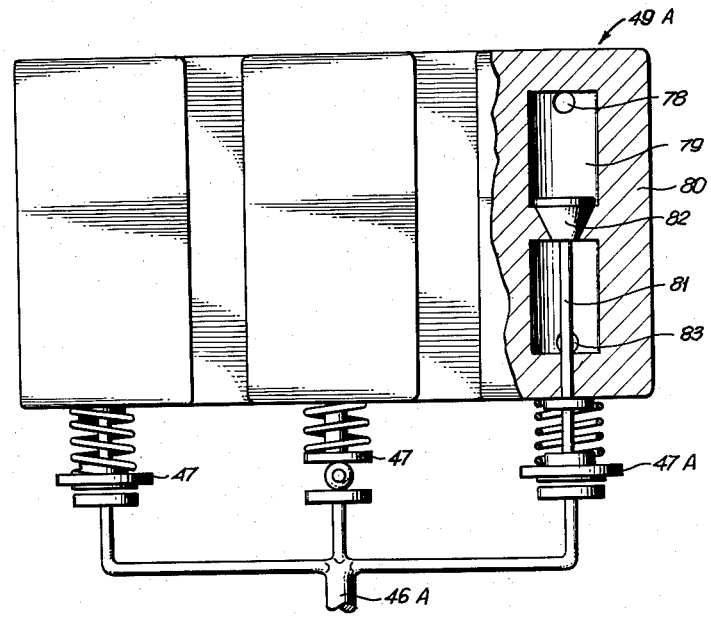
FIG. 6 is a fragmentary side sectional view of a modified form of the control assembly.
Figure 7:
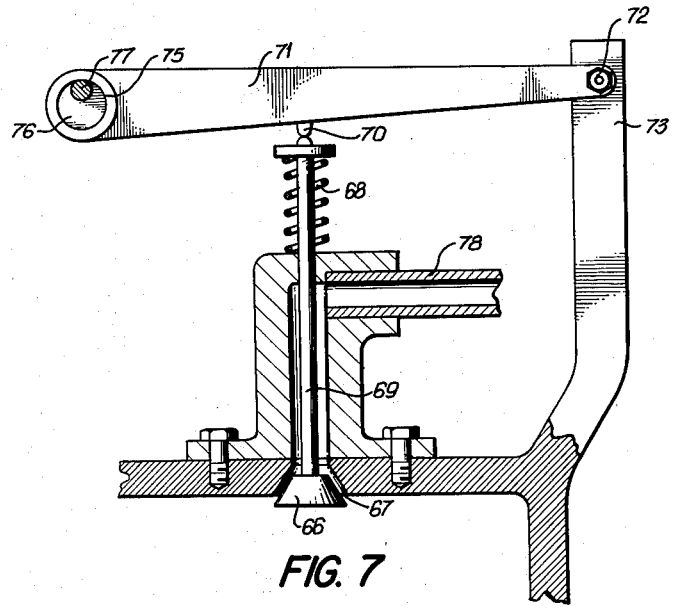
FIG. 7 is an enlarged detail view illustrating an adjustable outflow control valve for the air tank shown in FIG. 5.

In certain cases, it may be desirable to supply fresh air directly to the combustion chamber 1 in addition to the compressed hot recirculated combustion gases fed into the combustion chamber 1, instead of adding fresh air to the hot combustion gases as they pass through the scavenger 24, by means of the adjustable fresh air inlet valve 25. FIG. 5 shows in fragmentary form one such modification of the invention wherein there is no adjustable valve corresponding to the adjustable valve 25 shown in FIG. 1, connected to the scavenger 24A. However, in this modification, an auxiliary small air pump 59 shown in diagrammatic form, is electronically driven by battery or other electric power source B through the pressure-sensitive electric control switch S and supplies air under pressure through a conduit 60 to an accumulator or air pressure tank 61, which carries at its top an adjustable pressure relief and safety valve indicated generally at 62 and including a check valve 63 provided with adjustable biasing spring means 64 normally setting the opening and closing pressure points of the check valve 63. The pressure tank 61 is further provided with a manually adjustable control valve, indicated generally at 65, adapted to control the rate of flow of pressurized air out of the tank 61. The adjustable control valve 65 includes a tapered valve member 66 normally seated against a valve seat 67 and maintained thereagainst by spring means 68, and also includes an upwardly directed valve stem 69 positioned for controlled abutment by projection 70 carried by an operating lever member 71 which is pivoted as indicated at 72 to a fixed support member 73 and which has its opposite end 74 provided with an aperture 75 carrying therein an eccentric cam 76 mounted on a shaft 77 which is adapted to be provided in a convenient acessible location with a manual operating lever (not shown) for rotating the shaft 77 and the cam 76 whereby to cause the operating lever member 71 to move downwardly so as to force the projection 70 against the upper end of the valve stem 69 whereby to open the valve 65 to any desired degree corresponding to the amount of rotation of the shaft 77, whereby to control the rate of outflow of pressurized air from within the pressure tank 61 through an outlet duct 78 connected to the hollow interior 79 of a third compartment portion 80 of the control assembly 49A, as is clearly illustrated in FIG. 6, whereby upward actuation of the control rod 81 by means of the third head of the tappet 46A against the corresponding third member 47A will unseat the valve member 82 and allow pressurized air from the tank 61 to flow through the hollow interior 79 past the open valve and out the duct 83 and then through the air injector 84 into the hollow interior of the combustion chamber 1A adjacent the fuel injector 3A. FIG. 6 clearly illustrates the three-headed structure of the upper portion of the control tappet 46A whereby the operation of the fuel control portion of the control assembly 49A, the recirculated hot gas control portion thereof, and the pressurized air control portion thereof are all operated in unison by the tappet 46A.

It will readily be understood that operation of an operating lever (not shown) connected to shaft 77 will vary the pressure of the air within the tank 61, which will correspondingly vary the amount of air fed through the air injector 84 into the hollow interior of the combustion chamber 1A. Thus the proper ratio of air with respect to the quantity of fuel fed into the combustion chamber 1A through the fuel injector 3A and also with respect to the quantity of recirculated hot combustion gas fed into the combustion chamber 1A through the hot gas injector 4A may be controlled to an optimum value for any given condition of speed or loading the entire turbine.

Although the invention has been described in considerable detail in the foregoing for the purpose of illustration, it is to be understood that such details are solely for this purpose and that variations can be made therein by those skilled in the art without departing from the spirit and scope of the invention except as set forth in the claims.

I claim:

1. A semi-closed cycle impulse-type gas turbine, comprising: a combustion chamber having a discharge part, said chamber being provided with at least a fuel nozzle, a hot compressed gas injector, and an ignition plug; a turbine casing provided with a single turbine rotor of the impulse type and a main shaft rotatably mounted with respect to said turbine casing and carrying said single turbine rotor thereon for rotation in said turbine casing, said turbine casing being provided with a turbine nozzle directed toward the periphery of the single turbine rotor within said turbine casing; a conduit leading from said discharge part of said combustion chamber to said turbine nozzle; said discharge part of said combustion chamber being provided with an exhaust valve in the exhaust gas flow path between said discharge part of said chamber and said conduit; said main shaft being provided with a cam effectively operating said exhaust valve in a reciprocating and properly timed manner; a compressor housing rotatably encompassing a portion of said main shaft and provided with and detachably carrying therein a compressor rotor; a turbine outlet conduit connected between an outlet portion of the turbine casing and an inlet portion of the compressor housing; a pressure chamber connected to an outlet portion of said compressor housing; a safety and relief valve mounted on said pressure chamber for controlling the pressure within said pressure chamber; a control assembly comprising a fuel pump and a control means to control the inlet of hot pressurized gases from said pressure chamber to said hot compressed gas injector communicating with the combustion chamber, said control means being effectively connected between said pressure chamber and said combustion chamber; a second cam carried by said main shaft; said fuel pump and said control means being mounted for simultaneous reciprocation by said second cam; and means intermittently operable and in synchronized relationship with respect to the operation of said control assembly for supplying pressurized air to said combustion chamber.

2. Apparatus of the character defined in claim 1, wherein said means for supplying pressurized air to said combustion chamber comprises: a second pressure chamber for the accumulation of pressurized air; air pump means in communication with said second pressure chamber for pressurizing same; manually adjustable regulating means carried by said second pressure chamber for controlling the air pressure therein; a second control means effectively connected between said second pressure chamber and said combustion chamber, said second control means being simultaneously and similarly operated by said second cam along with the operation of said fuel pump and the first-mentioned control means whereby to supply pressurized air to the combustion chamber in addition to fuel and recirculated hot pressurized exhaust gases; and manually adjustable outflow valve means regulating the flow of pressurized air to said second control means and said combustion chamber.

3. Apparatus of the character defined in claim 1, including a scavenger connected in said turbine outlet conduit, and wherein said means for supplying pressurized air to said combustion chamber comprises an adjustable regulatable fresh air intake valve connected to and carried by said scavenger, whereby a controlled supply of fresh air will be aspirated and mixed with the hot exhaust gases passing through said scavenger and will be compressed by said compressor rotor and intermittently fed through said control means and said hot compressed gas injector into said combustion chamber.

References Cited in the file of this patent

UNITED STATES PATENTS

| | | |
|---|---|---|
| 1,301,871 | Pauly et al. | Apr. 27, 1919 |
| 1,805,093 | Holzwarth | May 12, 1931 |
| 2,195,025 | Couzinet | Mar. 26, 1940 |
| 2,502,878 | Newcombe | Apr. 4, 1950 |
| 2,553,867 | Parducci | May 22, 1951 |

FOREIGN PATENTS

| | | |
|---|---|---|
| 149,367 | Great Britain | Aug. 19, 1920 |